(12) United States Patent
Dronzek, Jr.

(10) Patent No.: US 10,710,762 B1
(45) Date of Patent: Jul. 14, 2020

(54) CUT AND STACK PRESSURE SENSITIVE ADHESIVE SUBSTRATES AND PROCESS

(71) Applicant: Polymeric Converting LLC, Enfield, CT (US)

(72) Inventor: Peter J. Dronzek, Jr., New Milford, CT (US)

(73) Assignee: POLYMERIC CONVERTING LLC, Enfield, CT (US)

( * ) Notice: Subject to any disclaimer, the term of this patent is extended or adjusted under 35 U.S.C. 154(b) by 148 days.

(21) Appl. No.: 15/227,903

(22) Filed: Aug. 3, 2016

Related U.S. Application Data

(60) Provisional application No. 62/309,726, filed on Mar. 17, 2016, provisional application No. 62/200,455, filed on Aug. 3, 2015.

(51) Int. Cl.
| | | |
|---|---|---|
| *B65C 9/00* | (2006.01) | |
| *B32B 7/06* | (2019.01) | |
| *B32B 7/12* | (2006.01) | |
| *B32B 27/08* | (2006.01) | |
| *B32B 27/30* | (2006.01) | |
| *B65C 1/00* | (2006.01) | |
| *B65C 9/20* | (2006.01) | |

(Continued)

(52) U.S. Cl.
CPC ............... *B65C 9/0015* (2013.01); *B32B 7/06* (2013.01); *B32B 7/12* (2013.01); *B32B 27/08* (2013.01); *B32B 27/308* (2013.01); *B65C 1/00* (2013.01); *B65C 9/0065* (2013.01); *B65C 9/20* (2013.01); *G09F 3/02* (2013.01); *G09F 3/0297* (2013.01); *G09F 3/10* (2013.01); *B32B 2519/00* (2013.01); *B65C 2009/0018* (2013.01); *G09F 2003/0241* (2013.01)

(58) Field of Classification Search
CPC .... B32B 7/06; B65C 9/0015; Y10T 156/1052
See application file for complete search history.

(56) References Cited

U.S. PATENT DOCUMENTS

| | | |
|---|---|---|
| 3,203,326 A | 8/1965 | Obenshain |
| 4,603,629 A | 8/1986 | Pou |

(Continued)

OTHER PUBLICATIONS

SATO CS-9018 Cutter Stacker Operator's Guide, Sato Labeling Solutions America, Inc., 1140 Windham Pky., Romeoville, IL 60446, dated Feb. 12, 2007.

(Continued)

*Primary Examiner* — Mark A Osele
*Assistant Examiner* — Christopher C Caillouet
(74) *Attorney, Agent, or Firm* — Hedman & Costigan, P.C.; James V. Costigan; Kathleen A. Costigan

(57) ABSTRACT

A process of producing printed variably imaged labels cut to individual label sheets in a pre-defined sequence of variable information synchronized with the planogram of a retail store for labeling, output from a factory assembly line for unique product labeling or labeling of shipments from a fulfillment or distribution warehouse that all have unique data and follow a planogram or planned sequence. The labels are cut into single sheets using a cutter/stacker and either use a crack and peel liner or a stripped matrix around the label to facilitate easy removal and application. The cutter/stacker processes converted label stock that is either pre-printed and die cut and/or variably imaged.

12 Claims, 1 Drawing Sheet

Multifunctional Coating

Clear Film

Clear Adhesive

Lay Flat Liner

Friction Feed
Non-Blocking Seal Coat

(51) Int. Cl.
*G09F 3/02* (2006.01)
*G09F 3/10* (2006.01)
*G09F 3/00* (2006.01)

(56) References Cited

U.S. PATENT DOCUMENTS

| | | |
|---|---|---|
| 5,012,711 A | 5/1991 | Lane |
| 5,284,689 A * | 2/1994 | Laurash ............... G09F 3/10 |
| | | 283/81 |
| 5,485,919 A | 1/1996 | Samberg |
| 6,142,322 A | 11/2000 | Smith |
| 6,365,254 B1 * | 4/2002 | Zoller .................. B32B 7/06 |
| | | 428/40.1 |
| 7,287,001 B1 | 10/2007 | Falls |
| 7,760,095 B2 | 7/2010 | Murrah |
| 7,826,920 B2 | 11/2010 | Stevens |
| 8,011,126 B2 | 9/2011 | Nunez |
| 8,020,765 B2 | 9/2011 | Nunez |
| 8,147,156 B2 | 4/2012 | Ward |
| 8,306,651 B2 | 11/2012 | Chudy |
| 8,613,156 B2 | 12/2013 | Nunez |
| 8,626,613 B2 | 1/2014 | Dale |
| 8,762,212 B2 | 6/2014 | Falls |
| 8,836,990 B1 | 9/2014 | Dale |
| 8,885,204 B1 | 11/2014 | Dale |
| 8,910,864 B2 | 12/2014 | Falls |
| 8,928,923 B2 | 1/2015 | Nunez |
| 8,970,893 B1 | 3/2015 | Dale |
| 9,033,239 B2 | 5/2015 | Winkel |
| 9,060,624 B2 | 6/2015 | Hardy |
| 9,199,427 B2 | 12/2015 | Weidauer |
| 9,213,506 B2 | 12/2015 | Nunez |
| 2003/0003249 A1 * | 1/2003 | Benim ............... B65D 23/0878 |
| | | 428/35.7 |
| 2013/0340933 A1 * | 12/2013 | Stover .................. F41H 1/02 |
| | | 156/250 |
| 2014/0367017 A1 * | 12/2014 | Blackwell .......... B32B 38/0004 |
| | | 156/64 |
| 2014/0367472 A1 * | 12/2014 | Weidauer ............ B32B 38/0004 |
| | | 235/488 |
| 2016/0176159 A1 * | 6/2016 | Dickerson ................ B32B 7/06 |
| | | 428/40.1 |

OTHER PUBLICATIONS

SATO CS-9018 Cutter Stacker Maintenance Manual, Sato Labeling Solutions America, Inc., 1140 Windham Pky., Romeoville, IL 60446.

SATO LP 100R and CS-9018 Laser Printing Solution—Video—posted on YouTube; Dated: Mar. 28, 2013 Retrieved from Internet on or before [Apr. 25, 2018]; https://www.youtube.com/watch?v=xzL6dXk5Olo.

SATO CS-9018 Cutter/Stacker Laser Printer Accessory; Copyright: 2014 Retrieved from Internet on [Jun. 8, 2018]: http://pdf.directindustry.com/pdf/sato-america/cs-9018/14753-598730.html.

* cited by examiner

Multifunctional Coating 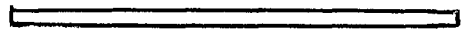
Clear Film 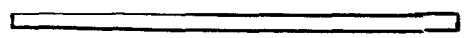
Clear Adhesive 
Lay Flat Liner 
Friction Feed
Non-Blocking Seal Coat 

CUT AND STACK PRESSURE SENSITIVE ADHESIVE SUBSTRATES AND PROCESS

This application claims the benefit of Provisional Application Ser. No. 62/200,455 filed Aug. 3, 2015 and Provisional Application Ser. No. 62/309,726, filed Mar. 17, 2016.

FIELD OF THE INVENTION

This invention relates to pressure sensitive adhesive coated substrates cut into stacks of single labels in a specific sequence that are easily applied by hand. The substrate material is film or paper with pressure sensitive adhesive backed by a removable release liner. The substrate can be scored, die cut, printed and/or variably imaged before conversion into stacks of cut labels. Optionally, monochrome or color variable imaging can be accomplished in a pre-arranged sequence of part numbers, product codes or shelf keeping unit codes using electronic printing technologies such as toner or inkjet imaging.

BACKGROUND OF THE INVENTION

The present invention relates generally to printable and electronically imagable clear and opaque pressure sensitive adhesive (PSA) coated film or paper substrates for hand applied labels of all types used in product identification, marking, shipping and information display. The film substrate can be provided with a print receiver that has the multi-functional print properties of conventional printing techniques such as web offset, flexographic and gravure as well as variable imaging such as laser toner technologies and ink jet. The substrate with adhesive is provided with a lay flat release liner backing that will lay flat through the various printing, imaging, cutting and stacking processes.

An example of where this invention can be used is a laser printable-pressure sensitive adhesive coated label that is first printed with fixed information such as a company logo using conventional flexographic printing techniques before the label is variably imaged in roll or fan-fold format for subsequent conversion into cut stacks of discreet labels.

The labels for example, could be used in bar coding, product identification and price marking applications replacing polyester films or vinyl films mounted on a heavy release liner. The prior art variably imaged labels are typically processed as cut sheets or rolls with multiple labels on the sheet or roll that need to be manually separated by hand before application through the use of die cutting and/or perforation into individual labels. This is a time consuming labor intensive manual operation where single easily removable pre-cut labels would provide for time savings in application and a smoother application process.

Most preferably, the invention relates to a novel single ply substrate with a pressure sensitive adhesive, lay flat release liner and a multi-functional print receiver coating that can be cut into stacks of labels through the entire substrate where the face stock and adhesive would not need to be removed in the areas being cut to form the shape of the label. In addition to providing conventional print reception, the receiver coating also provides and helps maintain the electrical properties through all processing needed for toner electrostatic printing, also known as laser printing and to control the anti-static properties of the label for ease of processing, handling and separation in a cut stack of labels.

Printed labels comprise an important form of communication for permanent and temporary labeling of various items. Labels are commonly used to convey information in a wide range of applications. While this invention is not limited to any specific market area that would use a hand applied label and this disclosure is in no way meant to be limiting, shelf labels used in the retail environment familiar to all will be used for illustrative purposes.

For example, in the retail environment, labels are commonly applied to product displays to identify objects and to convey information about those objects to customers such as pricing, product identification, sale details, etc. Product information tends to be dynamic in this environment and product offerings and pricing undergo frequent changes. Point-of-sale product labeling is often changed by applying new labels to the edge of shelves on which the products are displayed. Such shelf labeling is a significant part of the labeling activity in commercial retail establishments and large numbers of labels are used today in retail outlets for shelf edge price marking and promotional labels called shelf talkers. The typical retail market includes aisles of shelves on which identification and price labels are affixed using a pressure sensitive adhesive on the back side thereof which forms a removable bond with the shelf edge. A shelf talker is a special type of product label used for promoting brand identity, units of measure, price comparisons, and special sale pricing and promotions. The shelf talker is usually larger than the shelf label, and is used in addition thereto for increasing the visibility of the particular product being promoted. Shelf talkers are usually made of clear film that is placed over the price marker label and is designed to be removable from the base price label and shelf edge the contact clear label is applied over.

Labels with variable imaging are typically provided in groups of similar die cut size on individual sheets for collectively printing the desired information thereon. Fixed information, such as store identification and product graphics can be pre-printed in large quantities of the sheets in a suitable manner during the production of the die cut labels and variable imaged at a later time or die cut blank labels can be produced that are imaged with fixed and variable information at a later time. Variable information is printed on a common sheet such as the specific product, size, price or promotion information may be locally printed at a service bureau or distribution center that will distribute the labels or they can be printed on-demand at store level using laser, thermal transfer and direct thermal printers.

Due to their typical temporary applications and disposability, shelf labels must be easy to produce, install, remove and be durable to withstand the rigors of the application such as cleaning with various hard surface cleaners. Cost is always a significant factor for the substrate material. Lighter weight functional substrates are preferred for reduced shipping and distribution costs. As many prices and promotions change weekly, new shelf edge labels and shelf talkers are typically sent out by courier. Couriers are now migrating to "Conventional Packaging" where you pay a fixed price for a certain size package with fixed dimensions and an upcharge for excessive weight. A thinner composite of face stock, adhesive and liner will allow for more labels in a box and assist in reducing distribution costs under the new dimensional packaging pricing now used as a standard by most courier services. Because of the sheer volume of these types of labels that are consumed, an environmentally sustainable substrate is preferred.

A planogram is a visual diagram, or drawing, that provides in detail where every product in a retail store should be placed. These schematics not only present a flow chart for the particular merchandise departments within a store layout but also show on which aisle and on what shelf an item is located. A planogram should also illustrate how many facings are allocated for each Shelf Keeping Unit (SKU).

It is an object of this invention to provide for stacks of individual variably imaged labels to be applied that are cut and stacked in sequence to match up with the planogram of a retail store for ease of installation. This means that label variable imaging can be programmed to print in a sequence that when cut and stacked will be in order of application as one would walk down the aisle in a retail environment It is further an object of the invention to simplify the labeling process by producing stacks of individual labels with an easy application format using a crack and peel liner without having to break down imaged sheets of multiple labels into individual labels as is now done

DESCRIPTION OF THE PRIOR ART

Pressure sensitive labels for use in product marking are usually supplied in pre-printed rolls or sheets with many labels on a roll or sheet that need to be individually broken down and separated. Typically, film labels are produced with either heat resistant clear polyester film (PET) label face stock in the 0.002-0.003' thickness range or cast vinyl in the 0.003-0.004" thickness range. Polyester has the heat stability to transport and process through hot running printers like the typical laser sheet printer. Cast vinyl label substrate that is much more heat sensitive requires a heavy basis weight removable paper backing to absorb the heat shock as the material is being processed in a laser printer such as the typical 70-90# poly coated liners that range in thickness from 0.005-0.008" in thickness range. Oriented polypropylene (OPP) does not have the heat stability for hot laser printers because when exposed to high heat, the substrate tends to slightly shrink back to its pre-oriented (pre-stressed) state causing curl of the pressure sensitive laminate. Additionally, OPP will melt if there is a jam in the fuser section of a sheet fed laser.

In the prior art, rolls of cut labels can be applied at high speed with automatic applicators when configured to apply to an object that is the same geometry at all times such as a pressure sensitive label on a beer bottling line. It is cumbersome to apply labels by hand from a roll. Sheets of labels also need to be separated into individual labels and in the case of some shelf labels or shelf talkers where release liner is left on part of the label, separating the individual labels held together by perforations is a time consuming labor intensive process.

SUMMARY OF THE INVENTION

The invention is directed to a method of printing a transparent or pigmented opaque film or paper substrate having a top surface and a bottom surface, in a variable imaging printer and then cutting the labels into stacks of die cut single labels imaging in a sequence that is predetermined and synchronized with a planogram, production schedule or distribution plan.

Said Method Comprising:

(a) coating said bottom surface of said substrate with a layer pressure sensitive adhesive and optionally coating said top surface of said adhesive coated substrate with a functional top coating to receive the variable image;

(b) laminating a lay flat liner onto said layer of pressure sensitive adhesive to form a laminated transparent, pigmented opaque or paper substrate; and (c) converting said substrate into roll or fan-fold format with non-variable printing, judiciously placing scores, die cuts and or optional pin holes for tractor feed, and (d) passing said laminated single ply substrate through a variable image printer to affix printed indicia to said laminated substrate following a sequence that is predetermined and synchronized with a planogram, production schedule or distribution plan; and (e) processing the variable imaged roll or fan-fold through a cutter/stacker machine maintaining the synchronized sequence into stacks of discrete individually cut labels that are then easily applied by hand.

The present invention provides an economical process to produce variably imaged labels in cut single format that do not have to be separated from a master sheet or roll that are easily applied by hand.

Variable imaging can be accomplished in many ways to provide roll or fan-fold format printed pressure sensitive substrate converted through a through a cutter/stacker into individual labels. Imaging can be accomplished through high speed cold fusion lasers for monochrome applications using a printer from Printronix, Irvine, Calif. or Sato America, Charlotte, N.C. are preferred. Preferred Ink Jet printers are from Epson America, Long Beach, Calif. or Neuralog, Houston, Tex.

The label substrate has a top surface and a bottom surface. If a film, the top surface can be coated with a multifunctional coating for printing and/or variable imaging. The bottom surface has a pressure sensitive adhesive of high shear strength so it does not ooze supported on a release liner backing that exhibits good lay flat. It is critical that the label substrate and release liner combination be selected for optimum lay flat in fan fold format and after subsequent conversion into cut single labels. This can be accomplished through the use of a heavy basis weight liner greater than a 80# basis weight that provides stiffness and lay flat but it is preferred to use a stable liner with a basis weight less than 80# that is coated or treated to be stable because a thinner liner or face stock will allow for more footage on an input roll or in a fan-fold box which translates to longer more efficient run time, more labels in a stack, reduced cost for materials and lower distribution cost.

It is an object of the invention to provide a lower cost and more functional label production process from conversion through hand application for use in printing and variable imaging applications to achieve savings. Savings are accomplished through the use of thinner more economical substrate, adhesive and liner combination so more footage can be supplied on a roll and more sheets can be in a stack. Individual cut labels save time in application as they do not need to be separated by hand from a sheet or roll.

A key feature of the invention is sequencing the variable imaging with the planogram of a retail outlet that needs labels, sequencing with the production flow of a manufacturing line for unique identification labels or sequencing labels for a fulfillment distribution center to control the flow of properly labeled shipping packages.

The present invention allows for the use of conventional printing equipment with a conventional cut and stack machine that permits the centralized (such as a distribution center) or local preparation of cut stacks of pressure sensitive adhesive and release liner backed labels without the need for specialized machinery for the making of stacks of labels without release liner or adhesively bound pads of labels that have adhesive strips for attaching the labels to a surface.

A preferred aspect of the present invention is that it permits the use of a label stock that is relatively thin provided that the label stock is stiff enough that it can be processed through the stacker of a cut and stack machine without jamming due to the flexing of the cut labels. This is a particular advantage of the invention as it reduces that cost of the labels and the cost of shipping stacks of printed labels when the information on the labels is time sensitive.

BRIEF DESCRIPTION OF THE DRAWING

FIG. 1 is a schematic of a cross-section of a label according to the invention.

DETAILED DESCRIPTION OF THE INVENTION

The present invention provides for a pressure sensitive label substrate that is designed to be scored or die cut, printed and/or variably imaged and converted into stacks of individual labels that are efficiently hand applied.

The label structure is a paper or film with optional multi-functional top coating, on one side, pressure sensitive adhesive on the other side supported on a release coated liner that exhibits good flatness. The film can be clear (transparent) or pigmented (opaque). Clear and transparent film for purposes of this specification are used interchangeably to define a film substrate that allows light to pass through where objects held up against the back surface can be clearly seen.

Opaque film means the property of the film that prevents the transmission of light through the adhesive coated film substrate and prevents the show through of color on the surface the back side of the label is mounted to. Opacity is the ability of a substrate to resist the transmission of light through it and prevents show through of the underlying color or colors below the label.

Layflatness or Lay Flat means the curl resistant property of a paper, film or laminate that is usually measured by a visual comparison with a standard under controlled conditions.

The phrase pressure sensitive adhesive means the resulting adhesive layer after water or solvent is evaporated from an aqueous or solvent based adhesive respectively or it is the 100% solids layer of a hot melt or UV curable adhesive matrix.

Heat stability for the present invention means that the substrate and adhesive of the present invention when mounted to a release liner will process through printing, imaging and cutter/stacker equipment used in the current art without melting, shrinking and jamming in the printer due to distortion of the face stock or ooze of the adhesive under the printing conditions with good layflatness (only minimal curl) for processing through the cutter/stacker. This means slight curl of the laminate may be seen an exiting the printer but this will either flatten quickly as the composite cools and comes back to equilibrium or be minimal and will be sufficiently flat to not impact cutting and stacking. Sufficient lay flat is defined as that which will allow for cutting and stacking of individual cut single labels into a uniform stack.

Printable by conventional techniques means the substrate can be printed by gravure, flexographic or web offset printing techniques directly or through the use of a print receiving primer.

Electronically imagable printing techniques means printable by Toner Technology (laser dry toner or Indigo wet toner), High Speed Ink Jet (aqueous, solvent or UV) and thermal techniques through the use of a print receiving coating designed for the specific electronic imaging technology.

Adhesive tack is the sticky property of the adhesive coating measured by the peel force from a substrate.

Adhesive, ooze or creep resistance means that a pressure sensitive adhesive is less prone to building up on cutting dies, does not edge weld, resists cold flow under pressure such as when wound in a roll, resists oozing under the weight of stacks of sheets and does not ooze in individual sheets fed through the fusing section of a laser printer as the adhesive gets softer when heated.

Adhesive shear resistance can be used as an indicator of creep and ooze resistance. Optimally, an adhesive with a Shear Resistance of >500 minutes and most preferably >1400 minutes tested on stainless steel with a ½"×½" specimen and 450-550 g, preferably 500 g weight (according to the International Standard for Shear Adhesion of Pressure Sensitive Tape, PSTC 107, Procedure A, revised May 2007) provides for the best processing on the cutter stacker when cutting through the adhesive of the composite if a matrix of face stock and adhesive between labels is not removed.

The matrix can be removed during the processing step of cutting in the tractor feed side rails but the extra material between the labels that is thrown away increases the overall cost because more area of label substrate is needed and it is preferred to cut through the entire composite lamination. When this is done, the back liner must be scored for crack and peel ease of removability for all or a segment of the liner for application of the label to a surface such as a shelf edge.

Cold flow or adhesive creep is the shifting (flow) of adhesive that bonds the substrate to the release liner due to conditions that exceed the resistance limits of the adhesive used.

Cold fusion laser printers systems preferred for this invention typically run continuous forms (roll or fan-fold format with tractor feed) and employ lower temperature toner fusing technology and have a chill plate after heat fusing the toner to cool the substrate and produce less adhesive ooze due to heating and softening of the adhesive.

Flash Fusion laser printers systems most preferred for this invention typically run continuous forms and employ lower temperature fusing technology and heat fuse the toner with a flash of energy from a lamp so the fusing section is not always up to temperature and transfers much less heat to the substrate versus systems where the fuser is always at temperature. Typical systems use a Xenon lamp light source as the fusing mechanism to provide the heat energy to melt fuse the toner.

A pressure sensitive substrate with a "Crack and Peel" release liner is preferred. In this embodiment, the release liner of the face stock, pressure sensitive adhesive and release liner composite structure is scored to facilitate easy removal of all or part of the release liner by bending or flexing the substrate at the score towards the face stock to "crack" the liner at the core which provides for any easy starting point to peel off the liner segments created by the score. For smaller labels, one liner score can be used to create two segments that can be the same or different dimensions. For larger labels, multiple scores can be used. Liner score cutting for crack and peel will typically be performed during the printing and/or pin feed converting process but it is contemplated that an attachment can be adapted for a cutter/stacker machine to score cut the liner of a pressure sensitive stock in-line with cutting and stacking individual label sheets.

In another embodiment of the present invention, instead of a back liner score for crack and peel removability of the liner, a matrix can be stripped around the perimeter of the label face stock to provide a finger lift point to remove the label from the liner. Optionally, both a back liner score and face stock matrix removal can be used.

Films that can be used in this invention are selected based on the imaging technique and composite construction of the film, adhesive and liner. Various films can be used such a Polyester, Vinyl. If Cold or Flash Fusion laser systems or Ink Jet systems are used for variable imaging, more temperature sensitive films based on Polypropylene, Polyethylene and blends thereof can be used. Special mention is made of environmentally friendly films that are sustainable and/or biodegradable such as films based on Cellophane from Innovia Films based in the United Kingdom or Polylactic Acid based film available from Plastic Suppliers in Columbus, Ohio In terms of thickness, the substrate including the film and pressure sensitive adhesive (sans liner) should have a combined thickness from about 0.0014" to 0.005" and preferably about 0.0018" to 0.0038" for ease of hand application of the label. With a firm pressure sensitive adhesive that has low ooze, creep and cold flow resistance characteristics, the face stock and adhesive at the perimeter of the label that is removed (known as the matrix) in the current art for roll fed labels to facilitate removal optionally will not need to be removed before cutting and stacking. This is because adhesive build up on the cutting knives will be minimized with a firm adhesive where only intermittent cleaning of the cutting blades will be required. Using a back score for crack and peel removal of part or all of the release liner makes label removal easier than picking at the edge of a label substrate with the matrix removed. It is contemplated that back cutting the liner, removing face stock matrix or a combination of both can be used.

In special cases with label format smaller than the cutter/stacker apparatus can produce, it is contemplated that a single cut label sheet that is stacked can actually contain more than one small label if the size of the label is too small to process and handle in the cutter/stacker apparatus as a single label. A multiple label cut sheet may require more than one liner score cut.

Machine cutting is defined as slitting the material in the machine direction with razor, score or shear cut blades and transversely cutting with a knife mechanism in a repetitive sequence where the individual cut labels always are collected in the same sequence. For example, if a fan-fold sheet has four columns and five rows of labels (20 total labels after cutting) as follows:

| 1  | 2  | 3  | 4  |
|----|----|----|----|
| 5  | 6  | 7  | 8  |
| 9  | 10 | 11 | 12 |
| 13 | 14 | 15 | 16 |
| 17 | 18 | 19 | 20 |

A preferred embodiment of the invention is the sequential collection and stacking sequence of variable printed information based on the planogram layout of a store. Based on the leading feed edge of the sheet being the first row (labels 1-4) and with machine collection from left to right, the collection sequence would be the first row, left to right (labels 1-4) with label 1 at the bottom of the stack, then row two with label 5-8 continuing a row at a time with label 20 at the top of the stack created from this one sheet. Subsequent sheets would be added on top of the stack.

In a pre-defined sequence like this, variable imaged output can be programmed to the planogram of a store or the output of different parts from a manufacturing operation or labels for packages to be picked sequentially in a fulfillment and distribution warehouse.

Cutter stacker equipment that takes fan-fold or roll fed stock and converts it in a sequential manner into die cut individual pieces useable in the process of this invention are well known machines that are commercially available to process ticket stock. Machines of this type are manufactured by Tecnau, Billerica, Mass. and distributed by Sato America, Inc., Charlotte, N.C. The data sheets on the Tecnau TC400 and CS-9018 are hereby incorporated by reference. Other machines which may be used or adapted for use in the practice of the invention are described in U.S. Pat. Nos. 5,012,711; 4,603,629; 3,203,326 and EP 2,189,290 A2.

The preferred Sato CS-9018 cutter stacker provides a stack of die cut individual pieces that are delivered in a stack that is arranged in a substantially vertically stack as contrasted to a delivery in a "shingle style" stack where the die cut individual pieces are arranged individually or in groups so that they overlap the previously cut individual pieces either individually or in groups.

The preferred cutter stacker machine will have a tractor fed input for optimum registration that feeds in preprinted label or tag stock that has a pressure sensitive adhesive and a release liner in the form of a continuous sheet. This preprinted label or tag stock preferably has a caliper sized so that it does not jam in processing through the cutter stacker. Preferred thicknesses of such stock is 0.0035 to 0.012 inches and most preferably between 0005 to 0.009 inches.

Optimally, thinner substrates that allow for a greater number of labels in a stack are preferred for more efficient production, distribution and application economies.

The preprinted label or tag stock is fed up under a drag brush and protective cover, and onto the tractors. They are slit vertically by a slitter assembly, and then cut by an oscillating knife. Once cut, the tickets fall onto a vacuum transport where a vacuum belt holds them in place and moves them toward a stacker. As the labels or tags pass under the stacker hood they are put in order sequentially, as printed left-to-right across the forms, then placed on the stacking conveyor which delivers the stacked labels or tags in substantially vertically aligned stacks. The labels or tags may be printed with easily visible separator tickets that will be easily visible between batches in order to simplify the job of separating the batches of labels or tags when they are removed from the stacker.

Additional information regarding the preferred stacker cutter is provided in the SATO CS-9018 Operators Rev. 1.1 Feb. 12, 2007 and in the SATO Cutter Stacker Operators Guide Rev. 5 Sep. 14, 2011, both of which are incorporated by reference.

The separate cutter/stacker machines have been manufactured for and are used to process high volumes of non-pressure sensitive labels or tickets that are cut and stacked for use in the retail environment. The tickets that are also known as hang tags or tags without adhesive are affixed with a fastener and not an adhesive. The equipment has not been used to process pressure sensitive adhesive backed labels with a removable release liner and the literature on the machines calls the output from the machines tickets. Variable imaging is performed but it is as a batch process in a distribution center where a container of an item comes in and batches of tickets of the same type are produced on-demand to tag the item with a ticket showing product information before distribution. Then the next batch is processed. The novelty of this invention is the use of variable imaging and a cutter stacker sequenced with the various unique information of variably printed labels having a pressure sensitive adhesive and a release liner for different items being manufactured and labeled in factory, the items on a shelf to be labeled or relabeled with replacement or specialty sale labels in a store sequenced with the planogram of the store or sequential pick and ship labels in a fulfillment or distribution center based on the planogram of the stock in the fulfillment or distribution center.

In labeling, the typical adhesive thickness for labels being applied to smooth surfaces requires an adhesive deposition of from 0.0004 to 0.0012" (10-30.5 microns) in thickness and 0.001-0.0025" (25.4-63.5 microns) for more textured surfaces. Depending on the specific adhesive system, at the higher end of this adhesive coat weight where adhesive tack and ooze properties are greater, it may be advisable to remove the face stock and adhesive matrix around the label.

Over time with many thousands of cut labels, some adhesive build up may need to be cleaned from the slitter and cutter blades of the cutter/stacker as is typical with all pressure sensitive substrates being slit and die cut. With adhesive systems that exhibit high adhesive tack and low cohesive strength, it may be required to remove the face stock and adhesive matrix around the label. This will allow cutting through an adhesive and face stock free area on the carrier liner through the cutter/stacker but this increases the area of substrate consumed to create a label so it is always preferable to cut through the entire composite pressure sensitive substrate wherever the face stock and adhesive combination will support it.

Pressure sensitive adhesive polymers that can be used to practice this invention are available from Momentive Performance Materials, Roebuck, S.C. under the Synthebond™ trade name, from Franklin International, Columbus, Ohio under the Covinax™ trade name, from Arkema, Cary, N.C. under the Encor trade name, Avery Dennison Performance Polymers Division, Mill Hall, Pa. or Henkel Adhesives, Bridgewater, N.J. under the Gelva trade name. Pressure sensitive adhesives are well known and are commercially available. U.S. Pat. Nos. 2,884,126 and 3,575,911, which are incorporated by reference, provide examples of pressure sensitive adhesives. Crosslinking agents, such as those disclosed in U.S. Pat. No. 3,900,610, which is incorporated by reference, can be formulated into the adhesive to improve the toughness, durability and cohesiveness of the coating matrix as well as adhesion to the substrate if the adhesive is coated directly onto the substrate.

While the referenced adhesive systems are all aqueous based, this invention is not limited to the use of aqueous pressure sensitive adhesive systems and can use solvent based, 100% solids rubber+resin hot melt systems, 100% solids warm melt acrylic systems and 100% solids energy curable systems.

The keys to the successful process of creating a stack of die cut variably imaged single labels from a master roll of pressure sensitive face stock is as follows:

1—The choice of the proper paper label substrate or multi-functional top coating on clear or opaque film substrate that receives conventional indicia and variable image toner or ink jet image. The face stock also controls the volume and surface resistivity for optimum imaging, static free handling and coefficient-of-friction (COF) control for processing and stacking.

2—The choice of the proper permanent, removable or repositionable pressure sensitive adhesive that does not, cold flow, ooze or creep but has sufficient tack and adhesion properties for the end application.

3—The choice of the liner that provides for optimum support of the paper or film label substrate, layflatness, COF control for the best feeding and handling characteristics in the variable image printer and cutter stacker.

If a film label substrate is used, it can be enhanced to for coating and printing. This enhancement can come in basic forms such as corona, flame or plasma treatment in line with manufacturing or coating of the film to promote adhesion of the adhesive system, primer or printable top coating.

The functional coating for film includes resins formulated to allow the film to process in electronic imaging applications, especially laser printing applications.

The coating provides the following functionality:

Conventional Ink And Variable Image Receiver—the functional coating receives conventional ink (aqueous, solvent or energy curable) to print for example a fixed logo or background color and variable image through toner or ink jet imaging COF Control—In combination with the back side of the liner, the functional coating helps control the COF between the printable surface and back side of the liner to between 0.35-0.55 for optimum sheet stacking and separation.

Volume And Surface Resistivity Control For Laser Imaging—If the electrical volume resistivity of the composite sheet or the surface resistivity of the image side with print receiver is too high, the print may have print distortion because unwanted charges may move the toner to where it is not supposed to be. This is also called toner scatter. If the resistivity is too low, there may be deletions or missing toner because the charge placed on the receiver surface to transfer toner conducts away too rapidly. Volume or bulk resistivity of the composite label structure should be less than $10^{15}$ ohms-cm., preferably $10^9$-$10^{14}$ ohms-cm. and most preferably $10^{11}$-$10^{12}$ ohms-cm. Surface resistivity should be less than $10^{14}$ ohms-cm., preferably in the range of $10^9$-$10^{13}$ ohms-com. and most preferably $10^{11}$-$10^{12}$ ohms-cm. at the target 5.0-6.0 moisture range. Surface resistivity can be measured with Monroe Electronics Model 262A Surface Resistivity Meter and Volume Resistivity can be measured with Monroe Electronics Model 272A Volume Resistivity Meter after conditioning the test specimen for 30 minutes at 50% Relative Humidity The print receiving layer is coated on the side opposite the adhesive at a coat weight from 0.2-20 grains/MSI (MSI=1000 sq. in.) applied on the top surface of the cellulose film.

Optional general purpose acrylic print primer BP9050 available from Process Resources Corp, Thornwood, N.Y. at 0.25-1.5 gram/MSI coat weight may be applied before the print receiver.

A laser receptive coating such as PD969LP that contains an acrylic-urethane polymer with kaolin clay matting agent and humectants for moisture control is available from Process Resources Corp., Thornwood, N.Y. This material may be used at 0.4-1.0 grains/MSI coat weight. Special mention is made of this multi-functional coating which imparts printability by conventional techniques and laser toner technology. The coating also aids in controlling resistivity properties and COF. This coating system can also be applied over fixed printed indicia such as a background color to render the printed area receptive to toner.

The pressure sensitive adhesive selected needs to be firm under heat and pressure so it does not ooze under the heat and pressure of the fusing section of a laser toner imaging device. The adhesive cannot cold flow or creep from the edges of the label substrate causing edge welding or blocking or through the score cut in the liner when the pressure sensitive laminate is wound in rolls, stacked in fan-fold format or stacked in cut sheet format as individual labels. Covinax SMA-01 and SMA-02 from Franklin International are vinyl acrylic polymers developed for removable applications including shelf edge labels requiring cold temperature and room temperature functionality. An external cross-linker can be used to increase cohesive strength.

Liner—The choice of release liner is critical for release, layflatness and stacking. The release needs to be firm so the label face stock does not come loose and pre-dispense in the laser printer or cutter/stacker machine but is still easy to be removed by hand. A release level of 30 grams/in.-200 grams/in. and preferably 50 grams/in. to 100 grams/in. is preferred. A coated paper liner is preferred for layflat purposes but film liner or a film paper composite can be used. The paper can be coated on the side opposite the silicone or both sides before silicone coating to seal the paper to make it more moisture resistant under changing environmental conditions. Back side coating provides for a surface that has tooth for optimum handling and cut sheet separation. Tooth is defined as rough surface finish characteristics of the coated paper which in this case also provides an air gap for sheet separation. The silicone coated side if pre-coated to seal it, cannot have tooth and must be smooth and uniform for consistent smooth release and to be a good die cutting base. Tooth can be added to the non-silicone side of a film liner by coating it with a particle filled coating. Special reference is made of a composite release liner made up of a thin silicone coated polyester film release liner between 0.00048" and 0.00142" laminated with an adhesive to a tissue paper with a basis weight of 5-20#/ream. The polyester film provides a smooth release and barrier on a high tensile strength film and the tissue provides low COF and sheet separation for feeding.

Example 1

On the pilot coater, Avery E5590 pressure sensitive adhesive polymer was modified with 7 parts dry of 1 micron Alumina Tri-Hydrate and 0.35% CX-100 Aziridine cross-linker from DSM NeoResins to create a tough durable adhesive that does not ooze or cold flow and is cleanly removable from many surfaces. The modified adhesive was coated on 0.8 mil sustainable clear film substrate from Futamura in Japan at a coat weight of 8 grains/MSI and laminated to 64# basis weight treated lay flat liner from Silicone Solutions International, Toledo Ohio with nominal 50 gram release force. To the back of the liner, a non-blocking friction feed sealer coating PD720 available from Process Resources Corp. was applied to enhance handling and layflat.

PD969LP multi-functional coating was applied to the side opposite the adhesive at 1.2 grams/MSI.

The composite sheet was cut into roll stock that was then run through a press/die cutting unit to punch out pin feeds and fan fold the material.

The fan-fold material was then run through a Sato LP100R Industrial laser printer to confirm printability. The material imaged well on the laser printer with good toner adhesion and scratch resistance.

The pressure sensitive substrate was run through a Sato CS-9018 Cutter/Stacker. Individual die cut labels were collected and stacked in packs like a large deck of cards. The composite material had sufficient lay flat to process well in the cutter/stacker machine. This was done without making any adjustments to tune the machine for the pressure sensitive label stock. The cutter/stacker had previously been running rigid non pressure sensitive ticket stock. Without stripping a matrix, the material slit and cut well without edge ooze or significant adhesive build up on the blades. The stacks of cut material were oven aged at 140 F for one month and no edge welding from adhesive ooze was observed. The individual labels still separated like cards from a deck.

The invention claimed is:

1. A method of printing a single ply transparent or pigmented opaque film label substrate having a top surface and a bottom surface, in a variable imaging printer and then cutting and stacking the labels into stacks of single labels imaged in a sequence that is predetermined and synchronized with a planogram, production schedule or distribution plan, said method comprising sequentially carrying out the following steps:
   (a) coating said bottom surface of said single ply transparent or opaque film substrate with a layer consisting of pressure sensitive adhesive and optionally coating said top surface of said adhesive coated substrate with a functional top coating to receive the variable image;
   (b) laminating a layflat liner onto said layer of pressure sensitive adhesive to form a laminated transparent or pigmented opaque film substrate; and
   (c) converting said laminated transparent or pigmented opaque film substrate into roll or fan-fold laminated transparent or pigmented opaque film substrate, by placing scores, die cuts and or optional pin holes for tractor feed, and
   (d) passing said laminated substrate obtained in step (c) through a variable image printer to affix printed indicia to said laminated transparent or pigmented opaque film substrate obtained in step (c) to form a variable imaged roll or fan-fold following a sequence that is a predetermined and synchronized sequence with a planogram, production schedule or distribution plan; and
   (e) processing the variable imaged roll or fan-fold through a cutter/stacker machine by feeding said cutter/stacker machine with said variable imaged roll or fanfold as a continuous sheet wherein said cutting and stacking machine slits said variable imaged roll or fan-fold in the machine direction and cuts the imaged roll transversely with a knife mechanism while maintaining the synchronized sequence and delivering discrete individual labels into stacks of discrete individually cut labels that are then easily applied by hand where the volume resistivity of the laminated transparent or pigmented opaque film substrate is $10^9$-$10^{14}$ ohms-cm.

2. A method of printing a transparent or pigmented opaque film label substrate as defined in claim 1 where the volume resistivity of the laminated transparent or pigmented opaque film substrate is $10^{11}$-$10^{12}$ ohms-cm.

3. A method of printing a single ply transparent or pigmented opaque film label substrate having a top surface and a bottom surface, in a variable imaging printer and then cutting and stacking the labels into stacks of single labels imaged in a sequence that is predetermined and synchronized with a planogram, production schedule or distribution plan, said method comprising sequentially carrying out the following steps:
   (a) coating said bottom surface of said single ply transparent or opaque film substrate with a layer consisting of pressure sensitive adhesive and optionally coating said top surface of said adhesive coated substrate with a functional top coating to receive the variable image;

(b) laminating a layflat liner onto said layer of pressure sensitive adhesive to form a laminated transparent or pigmented opaque film substrate; and (c) converting said laminated transparent or pigmented opaque film substrate into roll or fan-fold laminated transparent or pigmented opaque film substrate, by placing scores, die cuts and or optional pin holes for tractor feed, and (d) passing said laminated substrate obtained in step (c) through a variable image printer to affix printed indicia to said laminated transparent or pigmented opaque film substrate obtained in step (c) to form a variable imaged roll or fan-fold following a sequence that is a predetermined and synchronized sequence with a planogram, production schedule or distribution plan; and (e) processing the variable imaged roll or fan-fold through a cutter/stacker machine by feeding said cutter/stacker machine with said variable imaged roll or fanfold as a continuous sheet wherein said cutting and stacking machine slits the variable imaged roll or fan-fold in the machine direction and cuts the imaged roll transversely with a knife mechanism while maintaining the synchronized sequence and delivering discrete individual labels into stacks of discrete individually cut labels that are then easily applied by hand where the surface resistivity of the laminated transparent or pigmented opaque film substrate is $10^9$-$10^{13}$ ohms-cm.

4. A method of printing a transparent or pigmented opaque film label substrate as defined in claim 3 where the surface resistivity of the laminated transparent or pigmented opaque film substrate is $10^{11}$-$10^{12}$ ohm-cm.

5. A method for labeling the shelves in a retail store which comprises sequentially carrying out the following steps:

(a) developing a planogram of an arrangement of all or part of displayed items in a particular retail store;

(b) printing pressure sensitive labels on a top side of a roll of a single-ply substrate consisting of a polyester film having on a bottom side, a layer consisting of a pressure sensitive adhesive coating covered with a layflat release liner said pressure sensitive labels being arranged in a sequence that follows all or part of a planogram of an arrangement of displayed items in a particular retail store to form a printed single ply substrate;

(c) cutting and stacking said pressure sensitive labels from a roll of said printed single ply substrate on a cutting and stacking machine by feeding said cutting and stacking machine with said roll of said printed single ply substrate as a continuous sheet wherein said cutting and stacking machine slits said roll of a printed single ply substrate in the machine direction and cuts the imaged roll transversely with a knife mechanism before individually stacking cut and stacked pressure sensitive labels so that said cut and stacked pressure sensitive labels will be arranged in a sequence that follows all or a part of a planogram of an arrangement of all or part of displayed items in said particular retail store, and;

(d) applying said pressure sensitive labels to all or part of said shelves by following the planogram of said store so that said pressure sensitive labels will correspond to said all or part of displayed items in a particular retail store where the volume resistivity of the laminated transparent or pigmented opaque film substrate is $10^9$-$10^{14}$ ohms-cm.

6. A method for labeling the shelves in a retail store as defined in claim 5 where the volume resistivity of the laminated transparent or pigmented opaque film substrate is $10^{11}$-$10^{12}$ ohms-cm.

7. A method for labeling the shelves in a retail store which comprises sequentially carrying out the following steps:

(a) developing a planogram of an arrangement of all or part of displayed items in a particular retail store;

(b) printing pressure sensitive labels on a top side of a roll of a single-ply substrate consisting of a polyester film having on a bottom side, a layer consisting of a pressure sensitive adhesive coating covered with a layflat release liner said pressure sensitive labels being arranged in a sequence that follows all or part of a planogram of an arrangement of displayed items in a particular retail store to form a printed single ply substrate;

(c) cutting and stacking said pressure sensitive labels from a roll of said printed single ply substrate on a cutting and stacking machine by feeding said cutting and stacking machine with said roll of said printed single ply substrate as a continuous sheet wherein said cutting and stacking machine slits said roll of a printed single ply substrate in the machine direction and cuts the imaged roll transversely with a knife mechanism before individually stacking cut and stacked pressure sensitive labels so that said cut and stacked pressure sensitive labels will be arranged in a sequence that follows all or a part of a planogram of an arrangement of all or part of displayed items in said particular retail store, and;

(d) applying said pressure sensitive labels to all or part of said shelves by following the planogram of said store so that said pressure sensitive labels will correspond to said all or part of displayed items in a particular retail store where the surface resistivity of the laminated transparent or pigmented opaque film substrate is $10^9$-$10^{13}$ ohms-cm.

8. A method for labeling the shelves in a retail store as defined in claim 7 where the surface resistivity of the laminated transparent or pigmented opaque film substrate is $10^{11}$-$10^{12}$ ohms-cm.

9. A method of printing a single ply transparent or opaque polyester, polypropylene, polyethylene, cellophane or vinyl film label substrate having a top surface and a bottom surface, in a variable imaging printer and then cutting and stacking the labels into stacks of single labels imaged in a sequence that is predetermined and synchronized with a planogram, production schedule or distribution plan, said method consisting of:

(a) coating said bottom surface of said single ply transparent or opaque polyester or vinyl film substrate with a layer consisting of pressure sensitive adhesive and optionally coating said top surface of said pressure sensitive adhesive coated single ply transparent or opaque polyester or vinyl film substrate with a functional top coating to receive the variable image;

(b) laminating a layflat coated paper liner onto said layer of pressure sensitive adhesive to form a laminate with said single ply transparent or opaque polyester or vinyl film substrate; and (c) converting said laminate with a single ply transparent or opaque polyester or vinyl film substrate into roll or fan-fold format with non-variable printing, placing scores, die cuts and or optional pin holes for tractor feed, and (d) passing said laminate with a single ply transparent, pigmented or opaque polyester or vinyl film substrate through a variable image laser printer to affix printed indicia to said laminate with a single ply transparent or opaque polyester or vinyl substrate following a sequence that is a predetermined and synchronized sequence with a planogram, production schedule or distribution plan; and (e) processing the variable imaged roll or fan-fold through a cutter/stacker machine by feeding said variable imaged roll or fan-fold into said cutter/stacker machine while maintaining the synchronized sequence and delivering discrete individual labels into stacks of discrete individually cut labels that are then easily applied by hand where the volume resistivity of the laminated transparent or pigmented opaque film substrate is $10^9$-$10^{13}$ ohms-cm.

10. A method of printing a transparent or opaque film label substrate as defined in claim 9 where the volume resistivity of the laminated transparent or pigmented opaque film substrate is $10^{11}$-$10^{12}$ ohms-cm.

11. A method of printing a single ply transparent or opaque polyester, polypropylene, polyethylene, cellophane or vinyl film label substrate having a top surface and a bottom surface, in a variable imaging printer and then cutting and stacking the labels into stacks of single labels imaged in a sequence that is predetermined and synchronized with a planogram, production schedule or distribution plan, said method consisting of:

(a) coating said bottom surface of said single ply transparent or opaque polyester or vinyl film substrate with a layer consisting of pressure sensitive adhesive and optionally coating said top surface of said pressure sensitive adhesive coated single ply transparent or opaque polyester or vinyl film substrate with a functional top coating to receive the variable image;

(b) laminating a layflat coated paper liner onto said layer of pressure sensitive adhesive to form a laminate with said single ply transparent or opaque polyester or vinyl film substrate; and (c) converting said laminate with a single ply transparent or opaque polyester or vinyl film substrate into roll or fan-fold format with non-variable printing, placing scores, die cuts and or optional pin holes for tractor feed, and (d) passing said laminate with a single ply transparent, pigmented or opaque polyester or vinyl film substrate through a variable image laser printer to affix printed indicia to said laminate with a single ply transparent or opaque polyester or vinyl substrate following a sequence that is a predetermined and synchronized sequence with a planogram, production schedule or distribution plan; and (e) processing the variable imaged roll or fan-fold through a cutter/stacker machine by feeding said variable imaged roll or fan-fold into said cutter/stacker machine while maintaining the synchronized sequence and delivering discrete individual labels into stacks of discrete individually cut labels that are then easily applied by hand labels into stacks of discrete individually cut labels that are then easily applied by hand where the surface resistivity of the laminated transparent or pigmented opaque film substrate is $10^9$-$10^{14}$ ohms-cm.

12. A method of printing a transparent or opaque film label substrate as defined in claim 11 where the surface resistivity of the laminated transparent or pigmented opaque film substrate is $10^{11}$-$10^{12}$ ohms-cm.

* * * * *